US011500617B2

(12) United States Patent
Coan

(10) Patent No.: US 11,500,617 B2
(45) Date of Patent: Nov. 15, 2022

(54) DATABASE INSTANCE DEVELOPMENT, TEST, AND DEPLOYMENT ENVIRONMENT

(71) Applicant: SAP SE, Walldorf (DE)

(72) Inventor: Thomas Coan, Carrieres sur Seine (FR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/119,401

(22) Filed: Dec. 11, 2020

(65) Prior Publication Data

US 2022/0188078 A1 Jun. 16, 2022

(51) Int. Cl.
G06F 9/44 (2018.01)
G06F 8/34 (2018.01)
G06F 3/0484 (2022.01)
G06F 8/71 (2018.01)
G06F 8/38 (2018.01)
G06F 8/60 (2018.01)
G06F 3/0482 (2013.01)

(52) U.S. Cl.
CPC .............. *G06F 8/34* (2013.01); *G06F 3/0482* (2013.01); *G06F 3/0484* (2013.01); *G06F 8/38* (2013.01); *G06F 8/60* (2013.01); *G06F 8/71* (2013.01)

(58) Field of Classification Search
None
See application file for complete search history.

(56) References Cited

U.S. PATENT DOCUMENTS 9,043,771 B1 * 5/2015 Vardhan ............... G06F 8/4435 717/151
2017/0085419 A1 * 3/2017 Zhang ...................... G06F 8/63
2019/0114164 A1 * 4/2019 Wong ...................... G06F 8/658
2019/0303187 A1 * 10/2019 Vu ............................ G06F 8/70

* cited by examiner

Primary Examiner — Wei Y Zhen
Assistant Examiner — Lanny N Ung
(74) Attorney, Agent, or Firm — Mintz Levin Cohn Ferris Glovsky and Popeo, P.C.

(57) ABSTRACT

In some implementations, there is provided a method that includes generating a user interface to enable selection of configuration information and initiation of a build of an application instance; receiving, from the user interface, an indication to initiate the build of the application instance; assigning at least one slave node to build, based on the configuration information, the application instance; obtaining, from at least one repository, build information including at least one of a command script, a dataset, and an application instance template; generating, based on the build information, a container file; storing the container file; generating the container image and storing the container image; and executing the image to provide a container. Related systems and articles of manufacture are also disclosed.

17 Claims, 7 Drawing Sheets

299

400

```
┌─────────────────────────────────────────────────────────────────┐
│ Provide a user interface to enable selection of configuration   │
│ information and initiation of an application instance build 402 │
└─────────────────────────────────────────────────────────────────┘
                                │
                                ▼
┌─────────────────────────────────────────────────────────────────┐
│ Receive, configuration information to build at least on         │
│ application instance 404                                        │
└─────────────────────────────────────────────────────────────────┘
                                │
                                ▼
┌─────────────────────────────────────────────────────────────────┐
│ Receive an indication to initiate the build of the at least on  │
│ application instance 406                                        │
└─────────────────────────────────────────────────────────────────┘
                                │
                                ▼
┌─────────────────────────────────────────────────────────────────┐
│ Assign one or more slaves to build the application instance(s) 408 │
└─────────────────────────────────────────────────────────────────┘
                                │
                                ▼
┌─────────────────────────────────────────────────────────────────┐
│ Get information (e.g., command script, datasets, and/or         │
│ templates) for the build 410                                    │
└─────────────────────────────────────────────────────────────────┘
                                │
                                ▼
┌─────────────────────────────────────────────────────────────────┐
│ Based on the information, generate a container file 412         │
└─────────────────────────────────────────────────────────────────┘
                                │
                                ▼
                        ╱ Dry Run ╲    YES    ┌──────────────────────┐
                       ╱  w/o      ╲─────────▶│ Store container file │
                       ╲  image?   ╱          │ 416                  │
                        ╲  414   ╱            └──────────────────────┘
                              │ NO
                              ▼
┌─────────────────────────────────────────────────────────────────┐
│ Generate container image 420                                    │
└─────────────────────────────────────────────────────────────────┘
                                │
                                ▼
                        ╱  Dry   ╲    YES    ┌──────────────────────────┐
                       ╱ Run w/   ╲─────────▶│ Store container image    │
                       ╲ image?   ╱          │ file 424                 │
                        ╲  422   ╱           └──────────────────────────┘
                              │ NO
                              ▼
┌─────────────────────────────────────────────────────────────────┐
│ Run container image 430                                         │
└─────────────────────────────────────────────────────────────────┘
```

FIG. 4

DATABASE INSTANCE DEVELOPMENT, TEST, AND DEPLOYMENT ENVIRONMENT

TECHNICAL FIELD

This disclosure relates generally to building, deploying, and testing applications.

BACKGROUND

Many organizations may rely on enterprise software applications including, for example, enterprise resource planning (ERP) software, customer relationship management (CRM) software, and/or the like. These enterprise software applications may provide a variety of functionalities including, for example, invoicing, procurement, payroll, time and attendance management, recruiting and onboarding, learning and development, performance and compensation, workforce planning, and/or the like. Some enterprise software applications may be hosted by a cloud-computing platform such that the functionalities provided by the enterprise software applications may be accessed remotely by multiple end users. For example, an enterprise software application may be available as a cloud-based service including, for example, a software as a service (SaaS) and/or the like.

SUMMARY

In some implementations, there is provided a method including a computer-implemented method that includes generating a user interface to enable selection of configuration information and initiation of a build of an application instance; receiving, from the user interface, an indication to initiate the build of the application instance; in response to receiving the indication to initiate the build of the application instance, assigning at least one slave node to build, based on the configuration information, the application instance; obtaining, from at least one repository, build information including at least one of a command script, a dataset, and an application instance template; generating, based on the build information, a container file; in response to the configuration information indicating a dry run that includes container file generation, storing the container file; in response to the configuration information indicating the dry run that includes the container file generation and container image generation, generating the container image and storing the container image; and in response to the configuration information allowing a container build, executing the image to provide a container.

In some variations, one or more of the features disclosed herein including the following features can optionally be included in any feasible combination. The user interface may be caused to be presented at a client device. The configuration information may be received, based on one or more selections performed via the user interface, wherein the configuration information enables the build of the application instance. The user interface may include a first selectable user interface element to enable selection of a master node, a second selectable user interface element to enable selection of a version of the application instance, and a third selectable user interface element to enable selection of an instance number to identify the application instance. The master node may assign the at least one slave node to build the application instance. The user interface may include a fourth selectable user interface element to enable selection of one or more datasets to include with the build of the application instance and a fifth selectable user interface element to enable selection of one or more libraries to include with the build of the application instance. The user interface may include a sixth selectable user interface element to enable selection of whether the application instance is allowed to create a user interface view during runtime execution and a seventh selectable user interface element to enable selection of whether container cleaning is performed. The user interface may include an eighth selectable user interface element to select a dry run that generates the container file but does not build the container image and a ninth selectable user interface element to select the dry run is allowed to build the container image. The configuration information indicating the dry run may include receiving the eighth selectable user interface element but not the ninth selectable user interface element. The configuration information indicating the dry run that includes the container file generation and the container image generation may include receiving the eighth selectable user interface element and the ninth selectable user interface element. The configuration information indicating the allowing of the container build may include receiving an indication that the eighth selectable user interface element is not selected. The container file may include a file including instructions for generating the container image. The container image may include an executable package for running the application instance on the slave.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 illustrates an example of a process, in accordance with some implementations of the current subject matter.

DETAILED DESCRIPTION

Database systems may be extremely complicated to develop, test, and even deploy. For example, a first instance of a database system may have a certain configuration that is different from another configuration being used for a second instance of the database system. These differences not only make deployment of the instances to cloud services difficult but it also makes development and testing difficult. And, these differences make configuration of each instance prone to errors (which reduces consistency and reproducibility). To that end, there is provided systems and methods that provides automated configuration of application instances, such as databases instances, in a reproducible and consistent manner.

Figure 1:
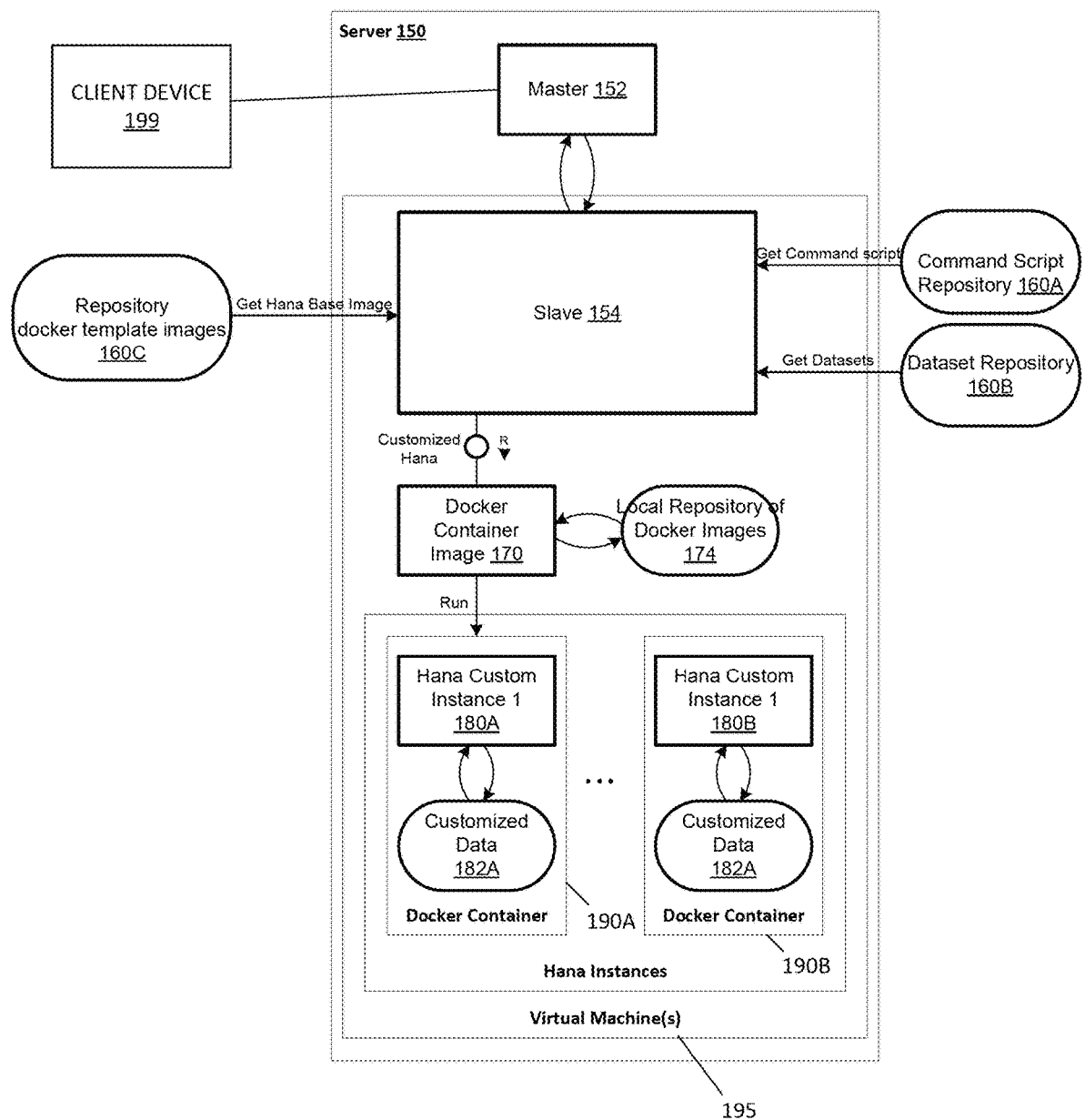
FIG. 1 illustrates an example of a system, in accordance with some implementations of the current subject matter.

FIG. 1 depicts an example of a development, test, and/or deployment system 100, in accordance with some example embodiments.

The system 100 may include one or more servers, such as server 150. The server 150 may be implemented as a part of (or coupled to) an orchestration system configured to deploy instances of applications to a cloud service, on-premise cluster, or in other types of systems. For example, an instance of an application, such as a database instance, may be deployed to a virtual machine hosted on a physical server machine at a cloud service and/or an on-premise cluster of physical servers. The cloud service may be a public cloud service, a private cloud service, and/or an on-premise cloud service. In some example embodiments, the orchestrator may be implemented using a development system, such as Jenkins, although other types of development systems may be used as well to develop, test, and/or deploy applications and instances of applications. The term "Jenkins" refers to a server that provides an automated environment for building, testing, and deploying applications.

The system 100 may include a master 152 that triggers one or more slave processes configured to automatically build, configure, and run application software, such as a database instance. The master may be deployed on a server 150, such that the single server 150 executes the master node 152, slave node 54, and the corresponding build. The master 152 may generate and/or provide, to a client device 199, a user interface from which the build may be triggered, managed, and monitored.

Although FIG. 1 depicts the master 152, the slave 154, and the corresponding runtime application instances 190A and 190B at the same, physical server 150, the master may distribute workload to a plurality of slaves at different physical servers hosting corresponding runtime application instances in a virtual machine. This distributed implementation may include deployments of the application instances to a public cloud service, a private cloud service, and/or an on-premise cloud service.

The master 152 may be configured to schedule build jobs, dispatch builds to one or more slaves (e.g., slave 154) for execution, monitor the one or more slaves, record build results, present build results, run tests, and perform other tasks.

The system 100 may, as noted, include one or more slaves, such as slave 154. The slave 154 may run on the same or different machine as the master. The slave may be configured to listen to requests from the master 152. The slave may execute jobs dispatched by the master.

In some example embodiments, the master 152 may receive an indication to begin a job, such as a build process for one or more application instances. This indication may be received from a user interface at client device 199.

Figure 2A:
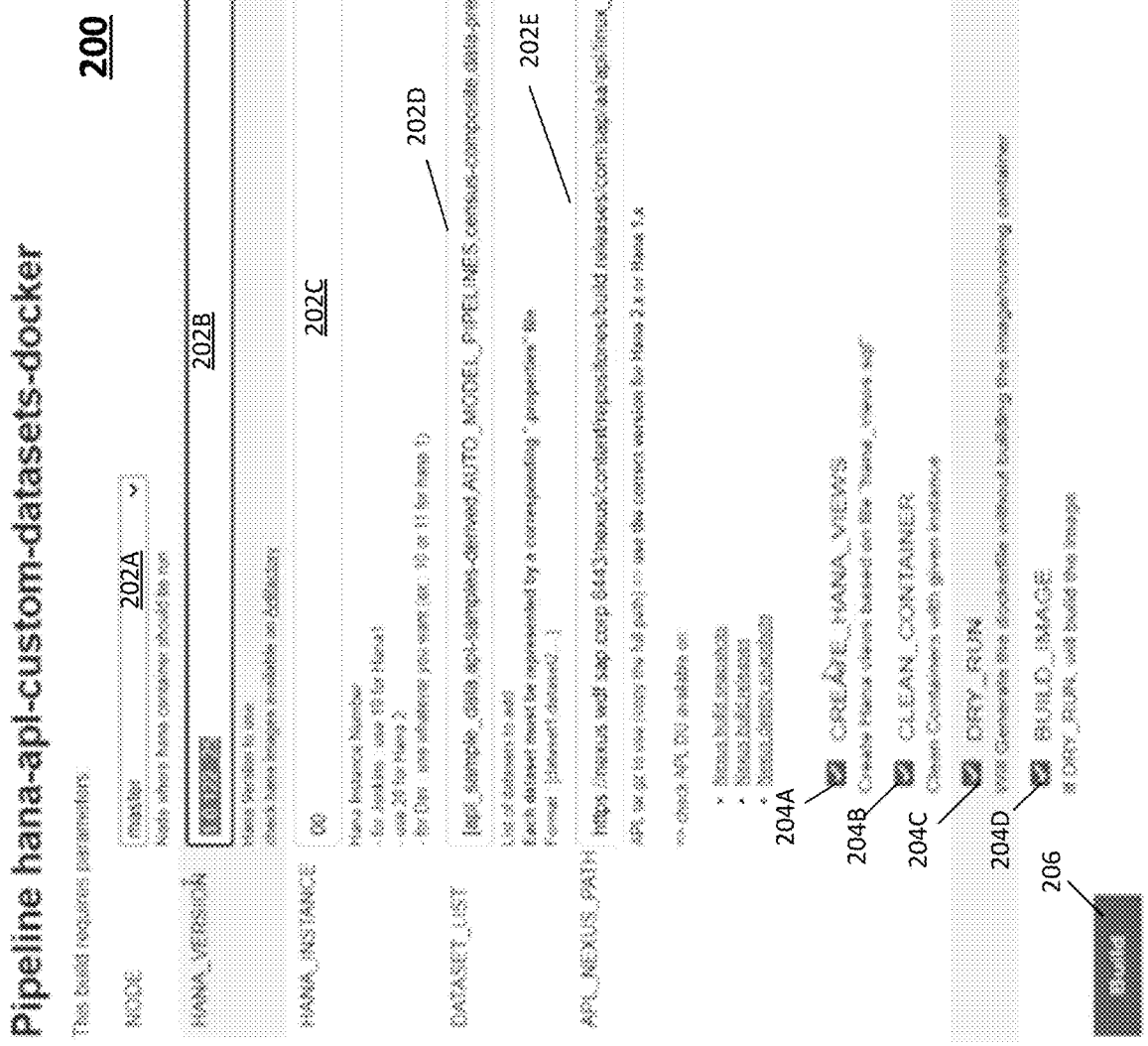
FIG. 2A and FIG. 2B illustrate examples of user interfaces, in accordance with some implementations of the current subject matter.

FIG. 2A depicts an example of a user interface 200 generated for presentation on the client device 199 accessing the server 150 and, in particular, the master 152. In the example of FIG. 2A, the user interface is used to select a specific master 202A to handle the build job of the one or more application instances. The user interface 200 may also be used to select a version 202B of the application instance to build. For example, a database instance may have a plurality of versions, so the build may specify the specific version to be tested. To illustrate further, regression testing may require build and test of older versions of an application as some users of the application instance may still be operating the older versions.

The user interface 200 may also allow identifying a specific instance by, for example, instance number. At a given machine A for example, there may be three instances of the application. In this example, the first application instance may be identified with instance number "10," the second application instance may be identified with instance number "25," and the third application instance may be identified with instance number "96." To illustrate further, the created application instance may be identified with the selected instance number at 202C, such as "00," for example.

The user interface 200 may also enable a selection of the datasets 202D which may be included as part of the build. In the case of a database instance for example, the database instance may need to have "data" to run and allow testing. This data may include system data, configuration data, operational data (e.g., data unique to a given set of clients, users, or customers), and/or other types of data.

The user interface 200 may also enable a selection of the libraries 202E that may be included as part of the build. For example, the selection may point to one or more libraries at which configuration data, templates, code/subroutines, classes, type specifications, and/or the like may be found and included in the build.

The user interface 200 may also be used to select aspects 204A-D of the application instance's build. For example, a user interface selection 204A may enable (or disable) the application instance's ability to perform certain tasks during runtime execution of the build of the application instance. In the case of the database instance, the selection 204A configures whether the application instance is allowed to create a view during runtime execution.

The user interface selection 204B may be used to clean a container. When a container is cleaned for a given application instance number (selected at 202C) being created, a check is performed to ensure that no other application instance exists with the same application instance number. For example, when creating a first application instance having application instance number "00" selected at 202C, a check is performed for other application instances having the same application instance number at a given host machine (or node). If a check reveals a prior application instance with application instance number "00," it is deleted. In the example of FIG. 2A, if cleaning is not selected, the prior application instance is not deleted as part of the cleaning.

The user interface selection 204C may be used to dry run a container file, such as a Docker file (although other types of containers may be used as well), without building a container image, which can be executed (e.g., run). The user interface selection 204D may be used to allow the container image to be built in the case of a dry run selection but the image will not be run (i.e., executed).

In some example embodiments, the user interface 200 may include a user interface element (e.g., "Build") 206, which when selected at the client device 199 causes the master 152 to trigger the build of the application instance(s) based on the selections 202A-E and 204A-D.

In some example embodiments, the master 152 may include script or other code in order to cause the generation of the user interface 200. In some example embodiments, the user interface 200 may be generated to include, as a single view at the client device 199, the selections 202A-E and 204A-D and the user interface element 206 (which triggers the master to start the build). In some implementations, the master generates the user interface 200 and causes it to be presented at the client device 199.

Referring again to FIG. 1, the master 152, based on the selections 202A-E and 204A-D and the indication 206, may assign one or more slaves, such as the slave 154, to build the application instance(s). In response, the slave 154 may then get, from one or more repositories 160A-C, information to configure the build.

For example, the slave 154 may, based on the configuration information received selections 202A-E and 204A-D, obtain a command script from a repository 160A. The command script may define the build job to be performed. To illustrate further, the command script may configure the slave 154 to perform one or more steps of a job, such as check the build and runtime environment where the instance(s) will be run, initialize the build and runtime environment, generate a container file (e.g., Docker file), build an image (e.g., a Docker image), and then run container image.

The slave 154 may also get any datasets required to configure the build. For example, the slave may obtain, from dataset repository 160B, data (e.g., database configuration data, database operational data, system data, and/or the like), and may obtain one or more libraries for the build of the container file.

The slave 154 may also get templates from repository 160C. These templates may correspond to Docker images of a base image for the application being built. For example, in the case of a database instance such as a HANA database instance, the template may represent a base HANA image. For example, the template may be a base application without being configured (e.g., with the configuration data). To illustrate further, a database instance image with the benefit of the configuration provided by the configuration data may correspond to a template. Based on this image available in the repository 160C, the template may be fetched. The repository 160C for the template may be identified or referenced in a script. After the template of the database image is fetched for example, the script is run to enrich the database image and configure the database instance. Although some of the examples refer to HANA (which is an in-memory database), other types of databases and/or application instances may be used as well.

Based on the information obtained from 160A-C, the slave 154 may then generate a container file 170, such as a dockerfile. The dockerfile may be a text file including the commands (e.g., instructions, code, script, etc.) for generating a container image, such as a Docker container image. The container image, such as the Docker container image, is an image, such as an executable package of software (including code, runtime, system tools, system libraries, and data needed to run an application instance). At runtime, the container image becomes a container. Although Docker containers are described in some of the examples herein, other examples of containers (also referred to as cloud containers) may be used as well including, for example, Amazon Elastic Container Service, AWS Fargate, Google Kubernetes Engine, Microsoft Azure Container Instances, Azure Kubernetes Service, and IBM Cloud Kubernetes Service.

In some embodiments, the container image is stored at a repository 174 that is local to the slave 154. This repository 174 may include a plurality of container images that have been built by the slave 154 (or other slaves). As noted above with respect to 204D, the build may generate a container image but not execute or run that image. For example, the local repository 174 may store an images locally where the image may be executed. Alternatively, or additionally, a central repository of images may be used as well, in which case the slaves executing the image for execution would fetch the image from the central repository.

To run the container image, the slave 154 may execute the container image at virtual machine hosted by a physical server machine. As noted, the container image becomes a container when executed at runtime. In the example of FIG. 1, the slave generates two container images for runtime execution as shown by containers 190A and 190B. Each container 190A-B represents a runtime instance of the application. For example, the first container 190A represents a first instance of the application (which in this example is a database instance of the HANA database) customized based on the configuration data 182A, which corresponds to customized data included or associated with the executable container image. The second container 190B includes a second instance of the application (which in this example is again HANA database instance) customized based on the configuration data 182B.

Figure 2B:
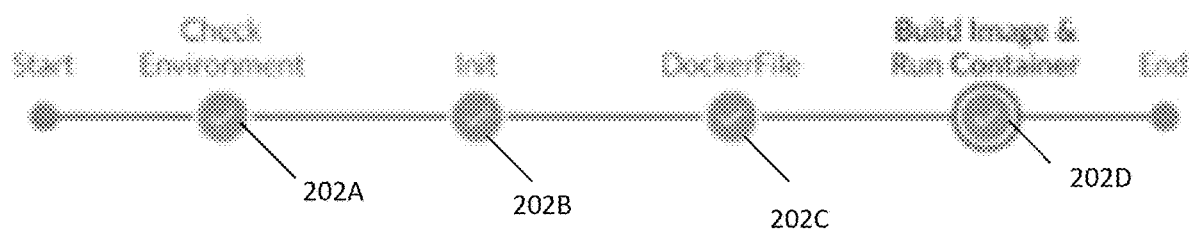

FIG. 2B depicts an example of a user interface 299 generated by the master 152 and presented at the client device 199, in accordance with some example embodiments. As the master monitors the progression of the build of the application instance, the master provides an indication of the build progress. In the example of FIG. 2B, the user interface indicates when the environment is checked 202A, when the environment is initialized 220B, when the container file, such as the Docker file, is created 202C, when the container image is built and run 202D, and when the job is completed 202E. The user interface 299 may also provide an indication of the time to build the instances, error information associated with the build, and the like. The check environment 202A stage checks one or more host machine capabilities to ensure that the application instance can indeed be run (e.g., a check of disk space, memory, etc.) as well as the availability of tools, such as Docker. The Init 202B stage prepares the environment by, for example, fetching scripts, creating a folder structure, mounting necessary components, and the like. In some implementations, the user interface 299 is generated by the master, which causes the user interface 299 to be presented at client device 199. Alternatively, or additionally, the user 299 interface may be generated and caused to be presented in response to selecting Build 206 at the user interface 199.

Figure 3A:
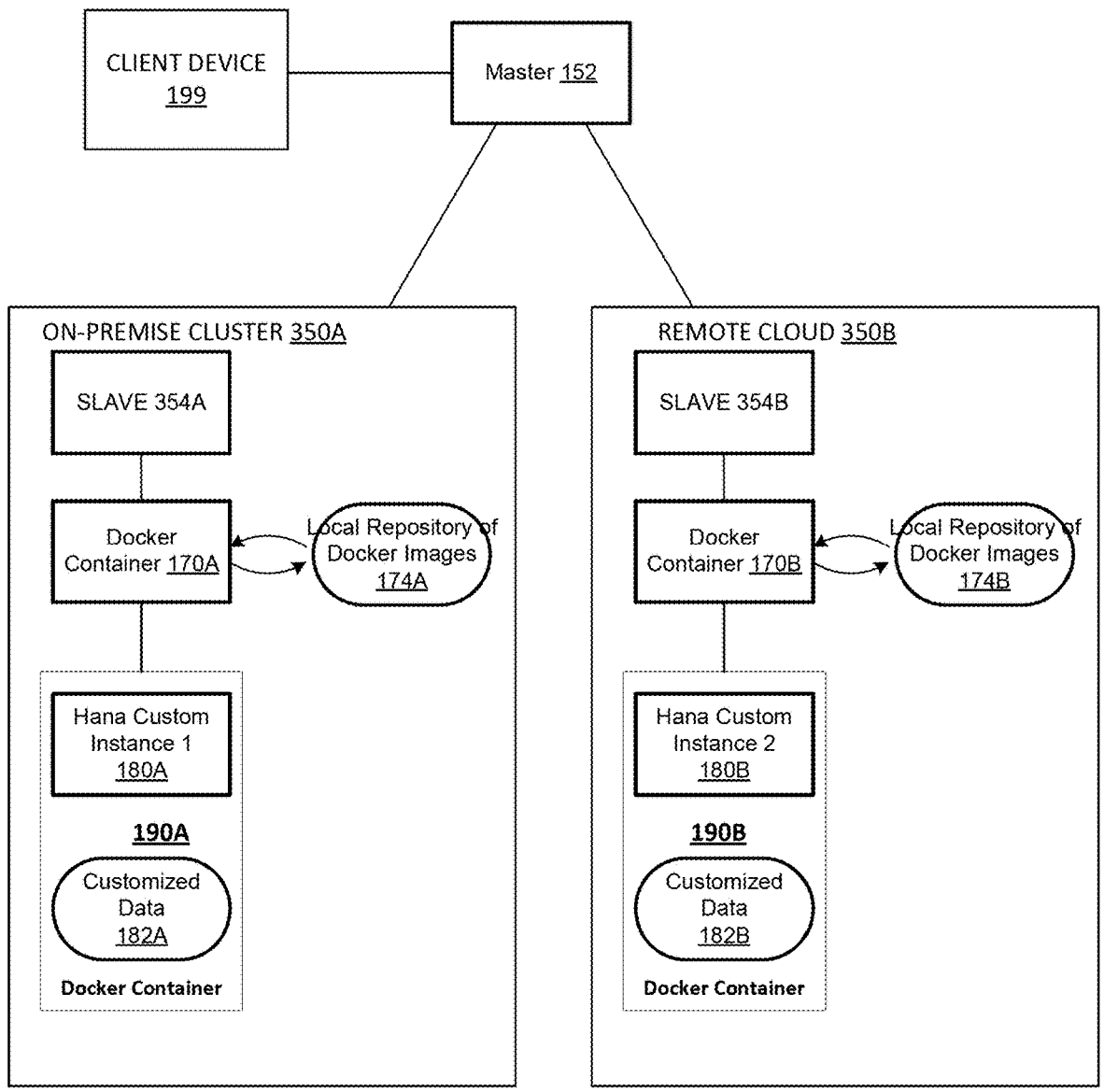
FIG. 3A illustrates an example of an on-premise and remote cloud system configuration, in accordance with some implementations of the current subject matter.

FIG. 3A illustrates an example of an on-premise and remote cloud system 300 configuration, in accordance with some implementations of the current subject matter. As noted, the master 152 may be used to develop, test, and/or deploy application instances to cloud based platforms including virtual machines. In the example of FIG. 3A, the master (via the slave 354A) deploys the first application instance 190A in an on-premise cluster 350A of physical servers and, in particular, a virtual machine that runs on one of the physical machines in the cluster. The master via the slave 354B deploys the second application instance 190B in a remote cloud platform 350B (which may be a public cloud platform or private cloud platform) of physical servers and, in particular, a virtual machine that runs on one of the physical machines in the remote cloud. The phrase "virtual machine" refers to a virtual computer including resource (e.g., CPU, memory, network interface, storage, etc.) hosted on a physical machine, such a physical server. A hypervisor may be used to create and execute virtual machines and enable the physical host machine serving to support one or more multiple virtual machines (e.g., enabling the sharing of physical resources among the one or more virtual machines).

Figure 3B:
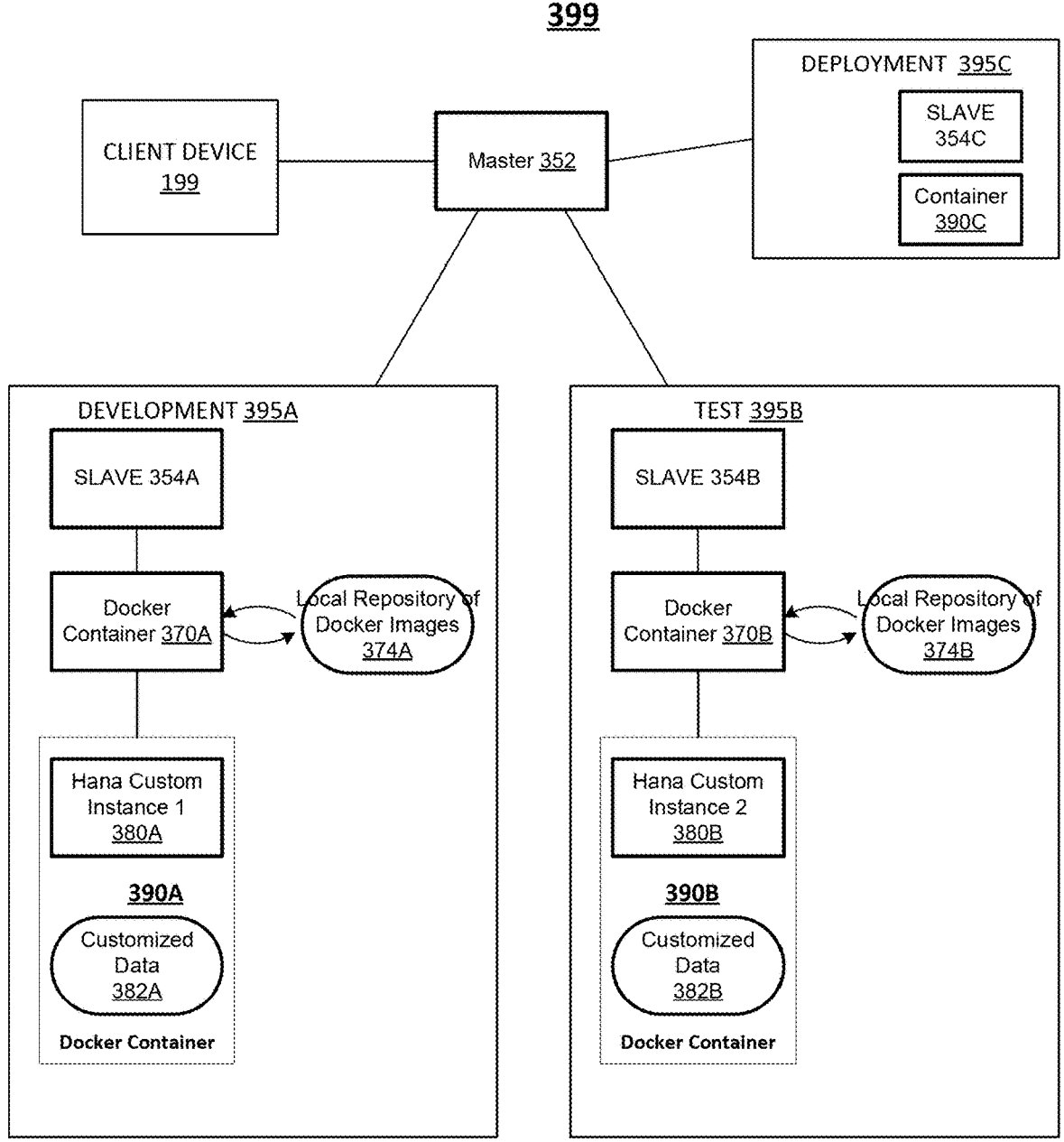
FIG. 3B illustrates an example of a development, test, and deployment system configuration, in accordance with some implementations of the current subject matter.

FIG. 3B illustrates an example of a development, test, and deployment system 399 configuration, in accordance with some implementations of the current subject matter. As noted, the master 152 may be used to develop, test, and/or build application instances. In the example of FIG. 3B, the master uses slave 395A to develop application instance 380A, uses slave 395B to test application instance 380B, and uses slave 395C to deploy (e.g., to an end-user and/or production) application instance 390C.

FIG. 4 depicts an example of a process 400 for building application instances, in accordance with some example embodiments.

At 402, a user interface may be provided to enable selection of configuration information and initiation of an application instance build, in accordance with some example embodiments. For example, the user interface 200 may be generated and presented by the client device 199. The master 152 may generate the user interface 200 and cause the user interface 200 to be presented at the client device 199.

At 404, configuration information may be received to build at least on application instance. For example, the user interface 200 presented on the client device 199 may be used to select a specific master 202A to handle the build job of the one or more application instances. Alternatively, or additionally, the user interface may be used to select which application instance number 202C to build. Alternatively, or additionally, the user interface may be used to select the datasets 202D which may be included as part of the build. Alternatively, or additionally, the user interface may be used to select the libraries 202E that may be included as part of the build. Alternatively, or additionally, the user interface may be used to select aspects 204A-D of the application instance's build. Alternatively, or additionally, the user interface may be used to select whether to clean 204B a container. Alternatively, or additionally, the user interface may be used to select to dry run a file, such as a dockerfile (although other types of containers may be used as well), without building an image, which can be executed (e.g., run). Alternatively, or additionally, the user interface may be used to select trigger the build 206. As noted, the user interface 200 may include, as a single view at the client device 199, the selections 202A-E and 204A-D and the user interface element 206 (which triggers the master to start the build).

At 406, an indication may be received to initiate the build of the at least on application instance. For example, in response to selection of a build, such as user interface element 206 (e.g., the "Build" user interface element), the master 152 may receive the selection as an indication to initiate the build of the application instance.

At 408, one or more slaves may be assigned to build the application instance(s). In response to the indication to build, the master may select and/or assign one or more slaves to build the application instance(s). For example, the master 152 may select slave 154 to build the application instances. The selection of slave 164 may be based on a capacity of the slave to handle the build or a capacity (e.g., in terms of memory, processing capacity, etc.) of the physical server hosting the slave.

At 410, information, such as command script, datasets, and/or templates, may be obtained for the build. For example, the slave 154 may access, based on the configuration information received selections 202A-E and 204A-D, obtain a command script from a repository 160A. Alternatively, or additionally, the slave 154 may also get, from dataset repository 160B, data (e.g., database configuration data, database operational data, system data, and/or the like), and may obtain one or more libraries for the build of the container file. Alternatively, or additionally, the slave 154 may also get from repository 160C templates for the build.

At 412, a container file may be generated based on the information. For example, the slave may generate a file, such as a Docker or container file. As noted, the container file may be a text file including the commands (e.g., instructions, code, script, etc.) for generating a container image, such as a Docker container image.

If dry run without image generation is selected, the container file is stored (yes at 414 and 416). For example, if 204C is selected to generate the container file without building or running the image (e.g., without 204D being selected), the slave may store the container file at local repository 174.

If dry run with image generation is selected, the container image is generated (no at 414 and 420). If 204C is selected and 204D is selected for example, the slave may generate the container image as part of the dry run. The container image is an executable package of software including code, runtime, system tools, system libraries, and data needed to run an application instance.

If dry run with image generation is selected, the container image is stored (yes at 422 and 424). If 204C is selected and 204D is selected for example, the slave may store the container image at local repository 174. In some implementations, process 400 may be used to create a single application instance, which may then be deployed to a plurality of host machines.

If dry run with image generation is not selected, the container image is executed (no at 422 and 430). If for example dry run is not selected at 204C, the slave 152 may generate the image and execute the image. To illustrate further, the slave 154 may execute the container image at virtual machine hosted by a physical server machine. As noted, the container image becomes a container 190A and 190B when executed at runtime. In the example of FIG. 1, the first container 190A represents a first instance of the application (which in this example is a database instance of the HANA database) customized based on the configuration data 182A, and the second container 190B includes a second instance of the application (which in this example is again HANA database instance) customized based on the configuration data 182B.

Figure 5:
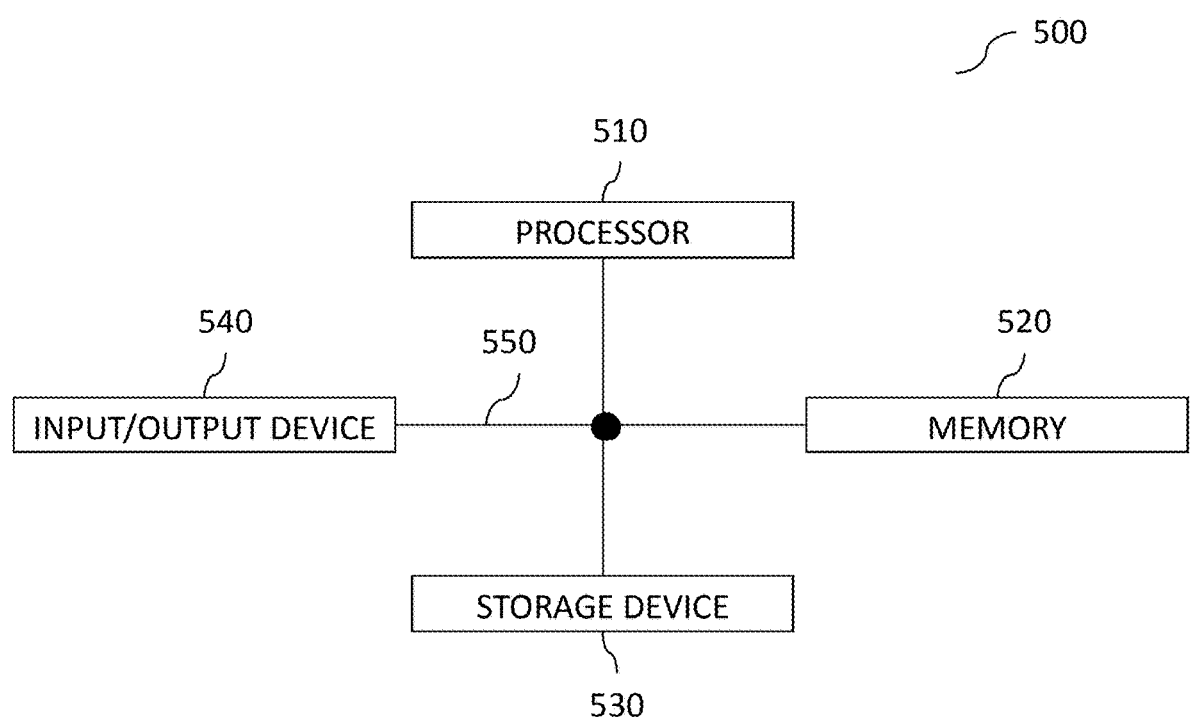
FIG. 5 is another example of a system, in accordance with some implementations of the current subject matter.

In some implementations, the current subject matter can be configured to be implemented in a system 500, as shown in FIG. 5. The system 500 can include a processor 510, a memory 520, a storage device 530, and an input/output device 540. Each of the components 510, 520, 530 and 540 can be interconnected using a system bus 550. The processor 510 can be configured to process instructions for execution within the system 500. In some implementations, the processor 510 can be a single-threaded processor. In alternate implementations, the processor 510 can be a multi-threaded processor. The processor 510 can be further configured to process instructions stored in the memory 520 or on the storage device 530, including receiving or sending information through the input/output device 540. The memory 520 can store information within the system 500. In some implementations, the memory 520 can be a computer-readable medium. In alternate implementations, the memory 520 can be a volatile memory unit. In yet some implementations, the memory 520 can be a non-volatile memory unit. The storage device 530 can be capable of providing mass storage for the system 500. In some implementations, the storage device 530 can be a computer-readable medium. In alternate implementations, the storage device 530 can be a floppy disk device, a hard disk device, an optical disk device, a tape device, non-volatile solid-state memory, or any other type of storage device. The input/output device 540 can be configured to provide input/output operations for the system 500. In some implementations, the input/output device 540 can include a keyboard and/or pointing device. In alternate implementations, the input/output device 540 can include a display unit for displaying graphical user interfaces.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   generating a user interface to enable selection of configuration information and initiation of a build of an application instance;
   receiving, from the user interface, an indication to initiate the build of the application instance;
   in response to receiving the indication to initiate the build of the application instance, assigning at least one slave node to build, based on the configuration information, the application instance;
   obtaining, from at least one repository, build information including at least one of a command script, a dataset, and an application instance template;
   generating, based on the build information, a container file;
   in response to the configuration information indicating a dry run that includes container file generation, storing the container file;
   in response to the configuration information indicating the dry run that includes the container file generation and container image generation, generating the container image and storing the container image; and
   in response to the configuration information allowing a container build, executing the image to provide a container,
   wherein the user interface includes a first selectable user interface element to enable selection of a master node, a second selectable user interface element to enable selection of a version of the application instance, and a third selectable user interface element to enable selection of an instance number to identify the application instance.

2. The computer-implemented method of claim 1, further comprising:
   causing the user interface to be presented at a client device;
   receiving, based on one or more selections performed via the user interface, the configuration information to enable the build of the application instance.

3. The computer-implemented method of claim 1, wherein the master node assigns the at least one slave node to build the application instance.

4. The computer-implemented method of claim 1, wherein the user interface includes a fourth selectable user interface element to enable selection of one or more datasets to include with the build of the application instance and a fifth selectable user interface element to enable selection of one or more libraries to include with the build of the application instance.

5. The computer-implemented method of claim 1, wherein the user interface includes a sixth selectable user interface element to enable selection of whether the application instance is allowed to create a user interface view during runtime execution and a seventh selectable user interface element to enable selection of whether container cleaning is performed.

6. The computer-implemented method of claim 1, wherein the user interface includes an eighth selectable user interface element to select a dry run that generates the container file but does not build the container image and a ninth selectable user interface element to select the dry run is allowed to build the container image.

7. The computer-implemented method of claim 6, wherein the configuration information indicating the dry run further comprises receiving the eighth selectable user interface element but not the ninth selectable user interface element.

8. The computer-implemented method of claim 6, wherein the configuration information indicating the dry run that includes the container file generation and the container image generation further comprises receiving the eighth selectable user interface element and the ninth selectable user interface element.

9. The computer-implemented method of claim 6, wherein the configuration information indicating the allowing of the container build further comprises receiving an indication that the eighth selectable user interface element is not selected.

10. The computer-implemented method of claim 1, wherein the container file comprises a file including instructions for generating the container image, and wherein the container image comprises an executable package for running the application instance on the slave.

11. A system comprising:
    at least one processor; and
    at least one memory including instructions which when executed by the at least one processor causes operations comprising:
      generating a user interface to enable selection of configuration information and initiation of a build of an application instance;
      receiving, from the user interface, an indication to initiate the build of the application instance;
      in response to receiving the indication to initiate the build of the application instance, assigning at least one slave node to build, based on the configuration information, the application instance;
      obtaining, from at least one repository, build information including at least one of a command script, a dataset, and an application instance template;
      generating, based on the build information, a container file;
      in response to the configuration information indicating a dry run that includes container file generation, storing the container file;
      in response to the configuration information indicating the dry run that includes the container file generation and container image generation, generating the container image and storing the container image; and in response to the configuration information allowing a container build, executing the image to provide a container, wherein the user interface includes a first selectable user interface element to enable selection of a master node, a second selectable user interface element to enable selection of a version of the application instance, and a third selectable user interface element to enable selection of an instance number to identify the application instance.

12. The system of claim 11, further comprising:
causing the user interface to be presented at a client device;
receiving, based on one or more selections performed via the user interface, the configuration information to enable the build of the application instance.

13. The system of claim 11, wherein the master node assigns the at least one slave node to build the application instance.

14. The system of claim 11, wherein the user interface includes a fourth selectable user interface element to enable selection of one or more datasets to include with the build of the application instance and a fifth selectable user interface element to enable selection of one or more libraries to include with the build of the application instance.

15. The system of claim 11, wherein the user interface includes a sixth selectable user interface element to enable selection of whether the application instance is allowed to create a user interface view during runtime execution, a seventh selectable user interface element to enable selection of whether container cleaning is performed, an eighth selectable user interface element to select a dry run that generates the container file but does not build the container image, and a ninth selectable user interface element to select the dry run is allowed to build the container image.

16. The system of claim 15, wherein the configuration information indicating the dry run further comprises receiving the eighth selectable user interface element but not the ninth selectable user interface element, wherein the configuration information indicating the dry run that includes the container file generation and the container image generation further comprises receiving the eighth selectable user interface element and the ninth selectable user interface element, and wherein the configuration information indicating the allowing of the container build further comprises receiving an indication that the eighth selectable user interface element is not selected.

17. A non-transitory computer-readable storage medium including instructions which when executed by the at least one processor causes operations comprising:
generating a user interface to enable selection of configuration information and initiation of a build of an application instance;
receiving, from the user interface, an indication to initiate the build of the application instance;
in response to receiving the indication to initiate the build of the application instance, assigning at least one slave node to build, based on the configuration information, the application instance;
obtaining, from at least one repository, build information including at least one of a command script, a dataset, and an application instance template;
generating, based on the build information, a container file;
in response to the configuration information indicating a dry run that includes container file generation, storing the container file;
in response to the configuration information indicating the dry run that includes the container file generation and container image generation, generating the container image and storing the container image; and
in response to the configuration information allowing a container build, executing the image to provide a container,
wherein the user interface includes a first selectable user interface element to enable selection of a master node, a second selectable user interface element to enable selection of a version of the application instance, and a third selectable user interface element to enable selection of an instance number to identify the application instance.

* * * * *